(12) United States Patent
Polk

(10) Patent No.: US 8,068,586 B2
(45) Date of Patent: Nov. 29, 2011

(54) DETERMINING A LOCAL EMERGENCY DIAL-STRING

(75) Inventor: James M. Polk, Colleyville, TX (US)

(73) Assignee: Cisco Technology, Inc., San Jose, CA (US)

( * ) Notice: Subject to any disclaimer, the term of this patent is extended or adjusted under 35 U.S.C. 154(b) by 1274 days.

(21) Appl. No.: 11/627,565

(22) Filed: Jan. 26, 2007

(65) Prior Publication Data

US 2007/0206730 A1    Sep. 6, 2007

Related U.S. Application Data

(60) Provisional application No. 60/775,096, filed on Feb. 20, 2006.

(51) Int. Cl.
    *H04M 11/00*      (2006.01)
(52) U.S. Cl. .................. 379/37; 379/45; 455/404.2
(58) Field of Classification Search ............ 379/37, 379/45; 455/404.1
See application file for complete search history.

(56) References Cited

U.S. PATENT DOCUMENTS

| | | | |
|---|---|---|---|
| 5,797,093 A | 8/1998 | Houde | 455/404 |
| 6,073,005 A * | 6/2000 | Raith et al. | 455/404.1 |
| 6,910,074 B1 | 6/2005 | Amin et al. | 709/227 |
| 7,433,673 B1 * | 10/2008 | Everson et al. | 455/404.1 |

FOREIGN PATENT DOCUMENTS

| | | |
|---|---|---|
| CN | 1282150 A | 1/2001 |
| EP | 1 073 298 A2 | 1/2001 |
| WO | WO 2005/114602 A2 | 12/2005 |

OTHER PUBLICATIONS

Droms, "Dynamic Host Configuration Protocol," Network Working Group, Bucknell University, 43/45 pages, Mar. 1997.
Droms et al., "Authentication for DHCP Messages," Network Working Group, Cisco Systems, 17 pages, Jun. 2001.
Polk et al., "Dynamic Host Configuration Protocol Option for Coordinate-based Location Configuration Information," Network Working Group, 15 pages, Jul. 2004.
Schulzrinne, "A Uniform resource Name (URN) for Services," SIP-PING, Columbia U., 8/7 pages, Jul. 10, 2005.
Peterson, "A Presence-based GEOPRIV Location Object Format," Network Working Group, NeuStar, 23/24 pages, Dec. 2005.
Schulzrinne, "Dynamic Host Configuration Protocol (DHCPv4 and DHCPv6) Option for Civic Addresses Configuration Information," GEOPRIV, Columbia U., 22/23 pages, Jan. 16, 2006.
Schulzrinne, "Emergency Services URI for the Session Initiation Protocol," Network Working Group, Columbia U., 11 pages, Jan. 28, 2006.
The First Office Action in Chinese Application No. 200780001687.9, dated Aug. 12, 2010, with translation, 17 pages, Aug. 12, 2010.

(Continued)

*Primary Examiner* — Stella Woo
(74) *Attorney, Agent, or Firm* — Baker Botts L.L.P.

(57) ABSTRACT

Determining a local emergency dial-string includes determining location information of an endpoint in a network. The location information indicates a current location of the endpoint. An emergency dial-string is received. The emergency dial-string is determined according to the location information, and the emergency dial-string operates to contact an emergency service associated with the current location of the endpoint.

32 Claims, 2 Drawing Sheets

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US 07/02915, dated Dec. 4, 2007, 8 pages.

European Search Report in European Patent Application No. 07749841.8-2414 / 1987663 PCT/US2007002915, dated Apr. 7, 2011, 8 pages.

H. Schulzrinne, "Emergency Services for Internet Telephony based on the Session Initiation Protocol (SIP)," Internet Engineering Task Force Internet Draft, *SANFACE Software*, (http://www.sanface.com/txt2pdf.html), Jan. 8, 2003, 15 pages.

Schulzrinne and Rosen, "Emergency Services for Internet Telephony Systems," draft-schulzrinne-sipping-emergency-arch-02, Internet Draft, *The Internet Society*, Oct. 18, 2004, 26 pages.

The People's Republic of China Second Office Action in Chinese Application No. 200780001687.9, dated Jul. 7, 2011 (received Sep. 6, 2011), 22 pages (with translation).

* cited by examiner

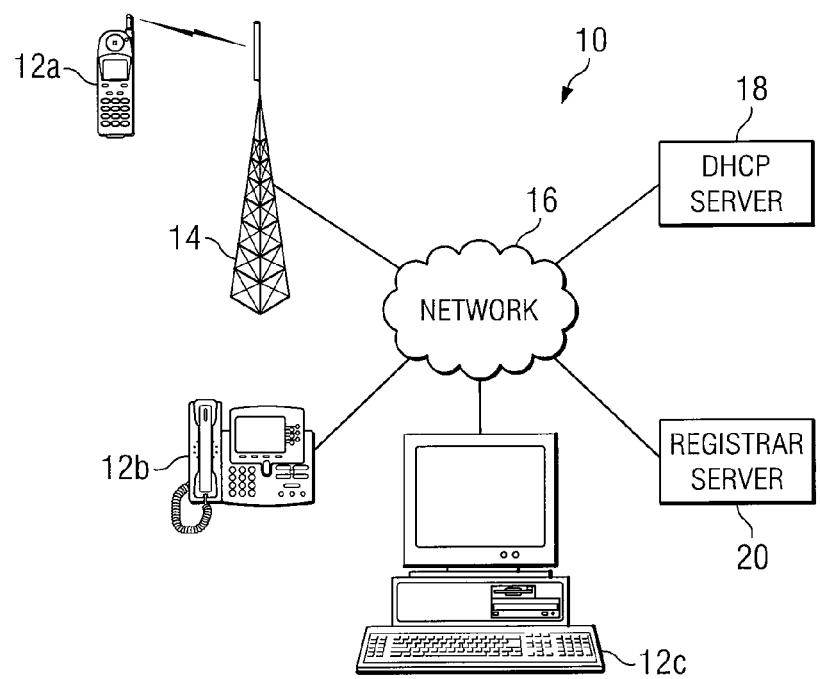
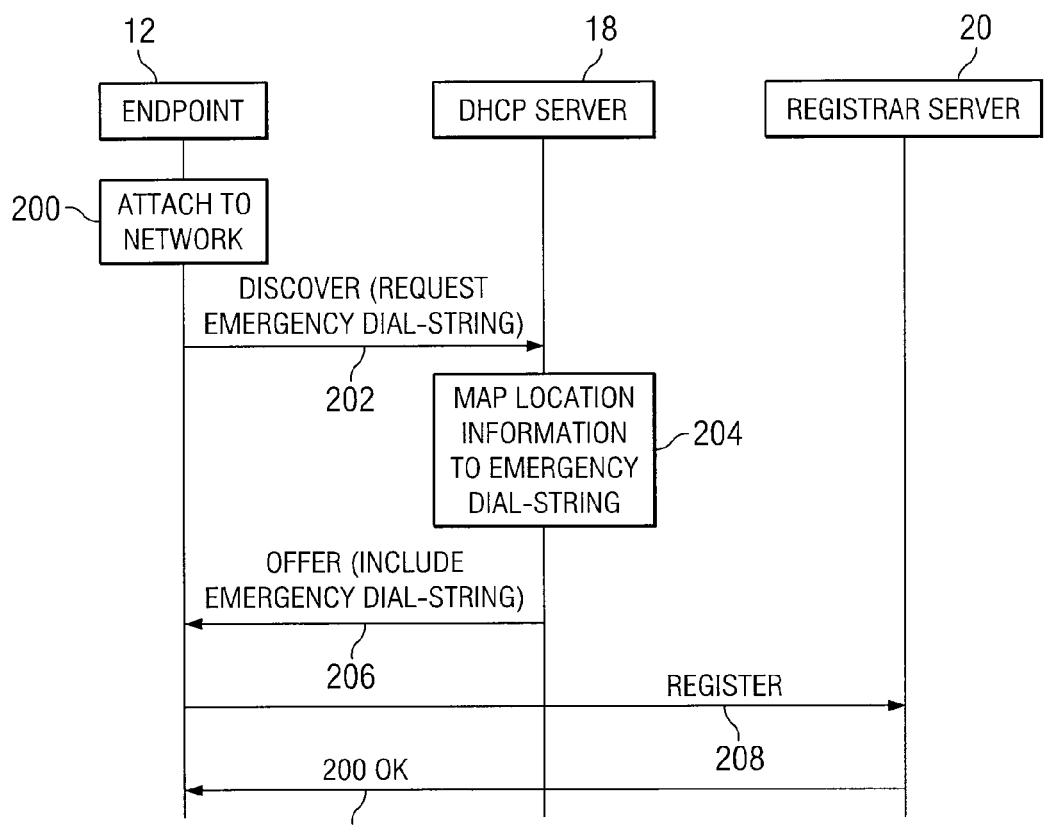
FIG. 1
FIG. 2

DETERMINING A LOCAL EMERGENCY DIAL-STRING

RELATED APPLICATION

This application claims the benefit under 35 U.S.C. § 119 (e) of U.S. Provisional Application Ser. No. 60/775,096 entitled: "Learning an Emergency Dial-String of a Public Safety Answering Point (PSAP)," filed on Feb. 20, 2006 and incorporated by reference herein.

TECHNICAL FIELD

This invention relates generally to communication services, and more specifically to, determining a locally significant emergency dial-string.

BACKGROUND

Placing an emergency call to a Public Safety Answering Point (PSAP) (i.e., an emergency call center) changes based on the caller's location. The numeric characters, or dial-string, used to place an emergency call may be different among different countries or continents, but is generally divided based on national boundaries. For example, a given dial-string may work throughout country A, but may not work anywhere else. The numeric characters may have a different number of digits or may include different digits. For example, a caller in the United States dials 911 to connect to a PSAP, a caller in the European Union dials 112 to connect to a PSAP, a caller in Japan dials 119 to contact an ambulance and the fire department and dials 110 for the police, and a caller in South Africa dials 10177 for an ambulance and 10111 for the fire and police departments. In some countries, an emergency call is either to a general number (i.e., 911 or 112) or the call is to a specific service (i.e., dialing 119 in Japan to contact an ambulance directly). Callers traveling to different countries may not know the emergency dial-string within the country in which the caller currently is located.

SUMMARY OF THE DISCLOSURE

In accordance with the present invention, disadvantages and problems associated with previous techniques for determining an emergency dial-string according to geographic location may be reduced or eliminated.

According to one embodiment of the present invention, determining a local emergency dial-string includes determining location information of an endpoint in a network. The location information indicates a current location of the endpoint. An emergency dial-string is received. The emergency dial-string is determined according to the location information, and the emergency dial-string operates to contact an emergency service associated with the current location of the endpoint.

Certain embodiments of the invention may provide one or more technical advantages. A technical advantage of one embodiment includes providing to an endpoint the appropriate numbered sequence, or dial-string, that may be used to contact an emergency service. The appropriate dial-string is determined by the location of the endpoint. With over sixty different dial-strings around the world, a user may not know the dial-strings of various locations. Therefore, providing local emergency dial-strings informs the user as the user moves to different locations.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a system for determining a local emergency dial-string;

FIG. 2 is a call-flow diagram illustrating an embodiment for determining the local emergency dial-string.

DETAILED DESCRIPTION OF THE DRAWINGS

Figure 3:
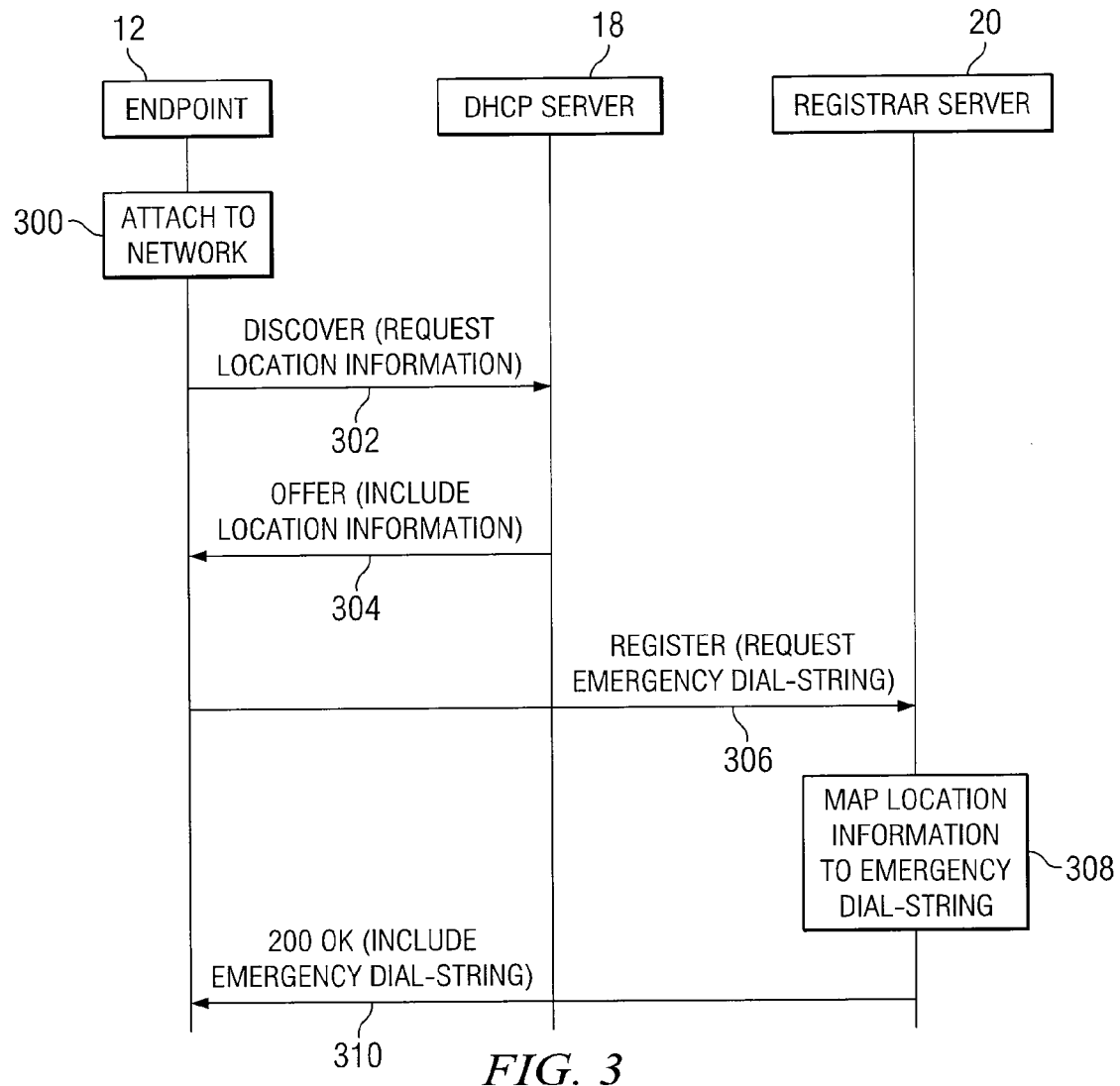
FIG. 3 is a call-flow diagram illustrating another embodiment for determining the local emergency dial-string.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 for determining a local emergency dial-string. System 10 includes one or more endpoints 12 that communicate with a Dynamic Host Configuration Protocol (DHCP) server 18 and a Session Initiation Protocol (SIP) registrar server 20 over a network 16. Endpoints 12 communicate with DHCP server 18, SIP registrar server 20, or a combination of the preceding to determine the local emergency dial-string. In an embodiment, an endpoint 12 requests the local emergency dial-string and receives the appropriate dial-string based on the location of endpoint 12.

In one embodiment, a dial-string may be used to call for emergency help in a particular geographic location. In some locations, multiple dial-strings may exist for various emergency services. For example, an emergency dial-string may exist for the police department, another emergency dial-string for the fire department, another emergency dial-string for the ambulance, and another emergency dial-string for mountain rescue.

Endpoint 12 determines the emergency dial-string based on the current location of endpoint 12, which may be described by location information. The location information of endpoint 12 may be represented in any suitable format, such as in coordinates (longitude and latitude) or in a civic format (country, state, and/or province). Endpoint 12 may determine its location in any suitable manner. In an embodiment, endpoint 12 may learn its current location through self-discovery, typically without interacting with another component in system 10. For example, endpoint 12 may establish its location by using a global positioning system (GPS), by reading location data that may have been manually configured into endpoint 12, or by implementing any suitable technique. In another embodiment, endpoint 12 may receive location information from any suitable component in system 10, such as DHCP server 18.

Endpoint 12 may determine the emergency dial-string during any suitable process. Endpoint 12 may be configured to receive the emergency dial-string from any suitable component in system 10 upon booting up or during network attachment time. In an embodiment, endpoint 12 may be configured to send a request to DHCP server 18 during the dynamic configuration process to determine the emergency dial-string. In another embodiment, endpoint 12 may send a request to SIP registrar server 20 to determine the emergency dial-string during registration for call-control purposes.

Endpoints 12 may send and receive data signals, audio signals, video signals, or any combination of the preceding. The signals may communicate information such as data, audio, video, multimedia, any other suitable type of information, or any combination of the preceding. For example, endpoints 12 may participate in packet-based communication where voice information is communicated through packets. The communication may be in the form of a call, a message, or any suitable form of communication.

Endpoints 12 may include, for example, a wireless or cellular telephone, an Internet Protocol (IP) telephone, a mobile handset, a computer supporting a telephony application, a Personal Digital Assistant (PDA), or any other endpoint suitable for communicating in system 10. As an example, endpoint 12a represents a wireless telephone that communicates with an Institute of Electrical and Electronics Engineers (IEEE) 802.11 base station 14. Base station 14 represents any suitable component to facilitate communication between a wireless telephone and network 16. As yet another example, endpoint 12b represents an IP telephone, and endpoint 12c represents a computer supporting a telephony application.

Endpoints 12 may support, for example, IP, mobile IP, Session Initiation Protocol (SIP), Media Gateway Control Protocol (MGCP), H.248, H.323, other suitable device or call control communication protocols, or any suitable combination of the preceding. Endpoint 12 includes hardware, software, or any suitable combination of the preceding.

Network 16 represents a packet-based network that allows components in system 10 to communicate with other networks, endpoints 12, or other components in system 10. Network 16 may include a metropolitan area network (MAN), a local area network (LAN), a wide area network (WAN), any other public or private data network, a local, regional, or global communication network, such as the Internet, an enterprise intranet, other suitable wireline or wireless communication link, or any suitable combination of the preceding.

Network 16 may include any combination of gateways, routers, hubs, switches, base stations (i.e., access points), and any other hardware or software that may implement any suitable protocol or communication. For example, network 16 provides support for any suitable packet-based protocol, such as IP version 4 or IP version 6, or any suitable call control protocol, such as SIP, MGCP, H.248, H.323, other suitable communication protocol, or any suitable combination of the preceding.

DHCP server 18 coordinates a communications transaction for endpoint 12 within system 10. DHCP server 18 receives a request to initiate a communications transaction, assigns a new address for a specific time period, and sends the new address to the requesting endpoint 12 together with other configuration information.

In an embodiment, endpoint 12 requests an emergency dial-string from DHCP server 18, and DHCP server 18 provides the local emergency dial-string to endpoint 12. DHCP server 18 may return the emergency dial-string in a DHCP option for providing a local emergency dial-string. Each DHCP request may be in individual packets or aggregated into a single request. DHCP server 18 includes hardware, software, or any suitable combination of the preceding to provide configuration information to endpoint 12 and to facilitate a communication session for endpoint 12.

SIP registrar server 20 represents any suitable SIP user agent that facilitates registration of endpoint 12 during the installation of endpoint 12 in system 10. SIP registrar server 20 uses any suitable technique to register the address, identity, location, or other suitable information of endpoint 12. For example, SIP registrar server 20 may receive a registration message from endpoint 12 requesting location information, an identity, a binding of an IP address to a contact address from DHCP server 18 (such as a Uniform Resource Identifier or an Address-of-Record), an emergency dial-string, or any other suitable information that endpoint 12 may use for a finite amount of time in the registration process. SIP registrar server 20 may provide this information to other components of system 10 when suitable to facilitate communication. SIP registrar server 20 responds positively to the registration message with the requested information and registration time limit. SIP registrar server 20 may receive individual registration messages or bulk registration messages from endpoints 12. Because SIP registrar server 20 may be located anywhere in the world, it can successfully respond to requests from endpoint 12 for the emergency dial-string. SIP registrar server 20 includes hardware, software, or a combination of the preceding to implement the registration process.

In an exemplary embodiment of operation, endpoint 12 attaches to network 16. Endpoint 12 requests the local emergency dial-string from any suitable component in system 10, such as DHCP server 18 or SIP registrar server 20. The component selects the appropriate dial-string based on the location of endpoint 12. If endpoint 12 receives the location information but not the emergency dial-string from the component, endpoint 12 may include the location information in a registration message to another component seeking the locally significant dial-string. Endpoint 12 receives the emergency dial-string from the component and provides the information to the user of endpoint 12. If endpoint 12 moves to a new location having a different dial-string, endpoint 12 may initiate another request for the new dial-string to any suitable component, such as DHCP server 18 or SIP registrar server 20. Alternatively, endpoint 12 may receive the new dial-string in response to detecting the new network 16 and attaching to the new network 16.

Modifications, additions, or omissions may be made to system 10 without departing from the scope of the invention. For example, endpoint 12 may determine more than one emergency dial-string. Endpoint 12 may determine a dial-string for a fire station, a police station, or other suitable emergency service provider if different dial-strings exist for each emergency service provider. This may be the appropriate mode if a country has a direct dialing expectation. As another example, endpoint 12 may include a service identifier that associates the emergency dial-string with the emergency service provider. As yet another example, endpoint 12 may determine a dial-string for a non-emergency service provider, such as the operator or general information (i.e., 411 in the United States). Moreover, the operations of system 10 may be performed by more, fewer, or other components. As another example, system 10 may have an additional server perform a mapping between the location information of endpoint 12 and the emergency dial-string associated with the location information. Any suitable logic comprising software, hardware, other logic, or any suitable combination of the preceding may perform the functions of system 10.

FIG. 2 is a call-flow diagram illustrating an embodiment for determining the local emergency dial-string. In the illustrated embodiment, endpoint 12 acquires the emergency dial-string during the dynamic device configuration process.

Endpoint 12 attaches to network 16 at 200. Upon attaching, endpoint 12 sends a DISCOVER message to DHCP server 18 at message 202. In the illustrated embodiment, the DISCOVER message includes a request for the location of endpoint 12, the emergency dial-string based on the location, and any other DHCP options to facilitate the configuration process. Endpoint 12 may be configured to request the emergency dial-string at any suitable time, such as upon attaching to a new provider or upon reestablishing a DHCP lease.

DHCP server 18 determines the appropriate emergency dial-string at 204 according to the location information of endpoint 12. DHCP server 18 transmits the information in an OFFER message to endpoint 12 at message 206. The OFFER message includes the location information, the emergency dial-string, and other information requested in the DISCOVER message. When endpoint 12 receives the emergency dial-string, it displays the dial-string in any suitable manner on endpoint 12. For example, the emergency dial-string may be represented as numeric characters on endpoint 12. Because endpoint 12 receives the emergency dial-string from DHCP server 18, endpoint 12 may continue the registration process without further attempts to determine the dial-string.

Endpoint 12 continues the process by registering with SIP registrar server 20. Endpoint 12 transmits a REGISTER message to SIP registrar server 20 at message 208, and receives a 200 OK from SIP registrar server 20 at message 210.

Modifications, additions, or omissions may be made to the call-flow diagram. For example, additional or fewer messages may occur in the call-flow diagram. DHCP server 18 may include the emergency dial-string in an INFORM message or a DHCP ACK. Although described in a particular sequence, messages in the call-flow diagram may occur serially or in parallel in any suitable order. The order of messages may vary according to the network type, configuration, and protocols in use between elements.

FIG. 3 is a call-flow diagram illustrating another embodiment for determining the local emergency dial-string. In the illustrated embodiment, endpoint 12 acquires the emergency dial-string during the registration process for call-control purposes. Endpoint 12 represents a SIP device that registers within system 10 using SIP registrar server 20.

Endpoint 12 attaches to network 16 at 300. Upon attaching to network 16, endpoint 12 transmits a DISCOVER request to DHCP server 18 at message 302. The DISCOVER request requests location information and other suitable information to facilitate the registration process. DHCP server 18 responds to the DISCOVER request with an OFFER reply at message 304. The OFFER reply includes responses to the requested information. For example, the OFFER reply includes the location information of endpoint 12.

In the illustrated embodiment, endpoint 12 does not request or receive the emergency dial-string from DHCP server 18, so endpoint 12 communicates with SIP registrar server 20 to determine the emergency dial-string. Endpoint 12 transmits a REGISTER message to SIP registrar server 20 at message 306. The REGISTER message provides for registration in system 10. In the illustrated embodiment, the REGISTER message includes the location information endpoint 12 received from DHCP server 18 and a request for the locally appropriate emergency dial-string. The REGISTER message may include the location information in any suitable format, for example, in a Presence Information Data Format-Location Object (PIDF-LO) message body according to Request for Comments 4119. SIP registrar server 20 may understand this message even if it is encrypted. For example, if the PIDF-LO is in a civic format, SIP registrar server 20 may understand the country and state or province in which endpoint 12 is located.

Using the location information received from endpoint 12, SIP registrar server 20 determines the appropriate emergency dial-string at 308. In the illustrated embodiment, SIP registrar server 20 includes a database that maps the location information to a dial-string. At message 310, SIP registrar server 20 transmits a 200 OK message to endpoint 12 that includes the emergency dial-string. When endpoint 12 receives the emergency dial-string, it displays the dial-string in any suitable manner. For example, the emergency dial-string may be represented as numeric characters on endpoint 12.

Modifications, additions, or omissions may be made to the call-flow diagram. For example, endpoint 12 may also learn its geographic location through a GPS chip, a DHCP ACK message, by any other suitable technique, or a combination of the preceding. Alternatively, SIP registrar server 20 may know the location of endpoint 12 without receiving the specific location information from endpoint 12.

As another example, system 10 may include another server to handle the mapping of the location information to the emergency dial-string associated with the location information. If SIP registrar server 20 receives the location information of endpoint 12 in a coordinate format, SIP registrar server 20 may transmit the coordinates to the other server to handle the coordinate-to-dial-string mapping.

As yet another example, additional or fewer messages may be communicated. Although described in a particular sequence, messages in the call-flow diagram may occur serially or in parallel in any suitable order according to the rules of each protocol involved. The order of messages may vary according to the network type, configuration, and protocols in use between elements.

Certain embodiments of the invention may provide one or more technical advantages. A technical advantage of one embodiment includes providing to an endpoint the appropriate numbered sequence, or dial-string, that may be used to contact an emergency service. The appropriate dial-string is determined by the location of the endpoint. With over sixty different dial-strings around the world, a user may not know the dial-strings of various locations. Therefore, providing local emergency dial-strings informs the user as the user moves to different locations.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for determining a local emergency dial-string, comprising:
   determining location information of an endpoint in a network, the location information indicating a current location of the endpoint;
   communicating the location information to a communication server in the network; and
   receiving an emergency dial-string from the communication server, the emergency dial-string determined according to the location information, the emergency dial-string operates to contact an emergency service associated with the current location of the endpoint.

2. The method of claim 1, further comprising attaching to the network, the attachment initiating determination of the emergency dial-string.

3. The method of claim 1, further comprising sending a request for the emergency dial-string.

4. The method of claim 1, further comprising sending a request for the emergency dial-string, the request comprising the location information of the endpoint.

5. The method of claim 1, wherein determining location information comprises implementing a self-discovery procedure to determine the location information.

6. The method of claim 1, wherein determining location information comprises sending a request for the location information to a Dynamic Host Configuration Protocol (DHCP) server.

7. The method of claim 1, wherein the emergency dial-string identifies the emergency service associated with the emergency-dial string.

8. The method of claim 1, wherein receiving the emergency dial-string comprises receiving the emergency dial-string from a selected one of a DHCP server and a registrar server.

9. The method of claim 1, wherein receiving the emergency dial-string comprises receiving the emergency dial-string in a DHCP response from a DHCP server.

10. The method of claim 1, wherein receiving the emergency dial-string comprises receiving the emergency dial-string in a Session Initiation Protocol (SIP) response from a registrar server.

11. The method of claim 1, wherein receiving the emergency dial-string comprises:
receiving a first emergency dial-string for a first emergency service; and
receiving a second emergency dial-string for a second emergency service.

12. Computer readable medium comprising logic for determining a local emergency dial-string, the logic when executed operable to:
determine location information of an endpoint in a network, the location information indicating a current location of the endpoint;
communicate the location information to a communication server in the network; and
receive an emergency dial-string from the communication server, the emergency dial-string determined according to the location information, the emergency dial-string operates to contact an emergency service associated with the current location of the endpoint.

13. The computer readable medium of claim 12, further operable to attach to the network, the attachment initiating determination of the emergency dial-string.

14. The computer readable medium of claim 12, further operable to send a request for the emergency dial-string.

15. The computer readable medium of claim 12, further operable to send a request for the emergency dial-string, the request comprising the location information of the endpoint.

16. The computer readable medium of claim 12, wherein determining location information comprises implementing a self-discovery procedure to determine the location information.

17. The computer readable medium of claim 12, wherein determining location information comprises sending a request for the location information to a Dynamic Host Configuration Protocol (DHCP) server.

18. The computer readable medium of claim 12, wherein the emergency dial-string identifies the emergency service associated with the emergency-dial string.

19. The computer readable medium of claim 12, wherein receiving the emergency dial-string comprises receiving the emergency dial-string from a selected one of a DHCP server and a registrar server.

20. The computer readable medium of claim 12, wherein receiving the emergency dial-string comprises receiving the emergency dial-string in a DHCP response from a DHCP server.

21. The computer readable medium of claim 12, wherein receiving the emergency dial-string comprises receiving the emergency dial-string in a Session Initiation Protocol (SIP) response from a registrar server.

22. The computer readable medium of claim 12, wherein receiving the emergency dial-string comprises:
receiving a first emergency dial-string for a first emergency service; and
receiving a second emergency dial-string for a second emergency service.

23. A system for determining a local emergency dial-string, comprising:
an endpoint operable to:
determine location information in a network, the location information indicating a current location of the endpoint;
communicate the location information to a communication server in the network; and
receive an emergency dial-string from the communication server, the emergency dial-string determined according to the location information, the emergency dial-string operates to contact an emergency service associated with the current location of the endpoint; and
a Dynamic Host Configuration Protocol (DHCP) server operable to provide the location information of the endpoint.

24. The system of claim 23, the endpoint further operable to attach to the network, the attachment initiating determination of the emergency dial-string.

25. The system of claim 23, the endpoint further operable to send a request for the emergency dial-string.

26. The system of claim 23, the endpoint further operable to send a request for the emergency dial-string, the request comprising the location information of the endpoint.

27. The system of claim 23, the endpoint further operable to implement a self-discovery procedure to determine the location information.

28. The system of claim 23, the DHCP server further operable to:
receive a request for the emergency dial-string from the endpoint;
determine the emergency dial-string according to the location information; and
send the emergency dial-string to the endpoint.

29. The system of claim 23, further comprising a registrar server operable to:
receive a request for the emergency dial-string from the endpoint;
determine the emergency dial-string according to the location information; and
send the emergency dial-string to the endpoint.

30. The system of claim 29, the registrar server further operable to:
send the location information to an external server; and
receive the emergency dial-string from the external server according to the location information.

31. The system of claim 23, the endpoint further operable to:
receive a first emergency dial-string for a first emergency service; and
receive a second emergency dial-string for a second emergency service.

32. A system for determining a local emergency dial-string, comprising:

means for determining location information of an endpoint in a network, the location information indicating a current location of the endpoint;

means for communicating the location information to a communication server in the network; and means for receiving an emergency dial-string from the communication server, the emergency dial-string determined according to the location information, the emergency dial-string operates to contact an emergency service associated with the current location of the endpoint.

* * * * *